United States Patent [19]

Heizmann

[11] Patent Number: 5,022,281

[45] Date of Patent: Jun. 11, 1991

[54] ARRANGEMENT FOR PRESELECTING AND SHIFTING A MOTOR VEHICLE GEAR SHIFT TRANSMISSION

[75] Inventor: Helmut Heizmann, Stuttgart, Fed. Rep. of Germany

[73] Assignee: Dr. Ing. h.c.F. Porsche AG, Fed. Rep. of Germany

[21] Appl. No.: 408,112

[22] Filed: Sep. 15, 1989

[30] Foreign Application Priority Data

Sep. 15, 1988 [DE] Fed. Rep. of Germany ....... 3831310

[51] Int. Cl.⁵ .......................... G05G 1/04; F16H 59/10
[52] U.S. Cl. ..................................... 74/473 R; 74/491
[58] Field of Search .............. 74/473 R, 491; 180/336

[56] References Cited

U.S. PATENT DOCUMENTS 4,050,325 9/1977 Shishido ............................. 74/473 R
4,132,124 1/1979 Iida ..................................... 74/473 R

FOREIGN PATENT DOCUMENTS 2743875 4/1978 Fed. Rep. of Germany .
62-8210 1/1987 Japan ................................. 74/473 R
1402662 8/1975 United Kingdom ............. 74/473 R Primary Examiner—Allan D. Herrmann
Attorney, Agent, or Firm—Evenson, Wands, Edwards, Lenahan & McKeown

[57] ABSTRACT

An arrangement for preselecting and shifting a motor vehicle gear shift transmission is disclosed. In order to provide a spatially compact arrangement for preselecting and shifting the motor vehicle gear shift transmission, the gear shift lever, which is to be operated manually, is guided at a joint square, the fixed bearings of which are mounted on a frame part of the motor vehicle chassis. A crosspiece of the gear shift lever forms a coupling device of the joint square.

4 Claims, 4 Drawing Sheets

ARRANGEMENT FOR PRESELECTING AND SHIFTING A MOTOR VEHICLE GEAR SHIFT TRANSMISSION

BACKGROUND AND SUMMARY OF THE INVENTION

The invention relates to an arrangement for preselecting and shifting a motor vehicle gear shift transmission having a gear shift lever which is provided at its upper end with a grip and is guided in the area of its lower end by a joint square which comprises at least two rocker devices pivoted at the vehicle frame and a coupling device by means of which the rocker devices are pivotally connected, a shift rod being pivotally connected to the lower end of the gear shift lever which engages in the gear shift transmission.

A similar gear shift arrangement is described in DE-OS 27 43 875. The gear shift lever is guided at a joint square which is composed of two rocker devices disposed in parallel with respect to one another and a gear shift lever housing which forms the coupling device. In the gear shift lever housing, the gear shift lever is pivoted by means of a ball joint. By means of a special arrangement of the joint axes and the adaptation of the distances between the axes, it is to be achieved that the swinging motions of the transmission are not transmitted to corresponding movements at the gear shift lever. In particular, no forward-directed, backward-directed or vertically directed movement must occur of the gear shift lever knob to be operated by the driver in order not to irritate the driver and to keep the knob steady.

It is an object of the invention to develop a shifting arrangement of this type in such a manner that it requires little installation space and can be constructed with few components.

This object is achieved by providing an arrangement wherein a cross piece of the gear shift lever forms the coupling device of the joint square, and wherein the rocker devices are pivotally connected at both sides of the cross piece. If a crosspiece of the gear shift lever represents the coupling device of the joint square or is rigidly connected with this coupling device, according to preferred embodiments of the invention, an approximately straight guiding can be achieved of the gear shift lever grip and of the shift rod mounted on the gear shift lever by means of the corresponding dimensioning of the lengths and the distances of the pivotal connecting points of the rocker devices. According to a preferred embodiment of the invention, a pivot pin fastened in eyes located on both sides and projecting out of them is sued as the crosspiece of the gear shift lever. At this pivot pin, joint pieces are disposed on the left and on the right to which the rocker devices are pivotally connected. When the gear shift lever is pivoted around the pivot pin, the shift rod is rotated around its longitudinal axis for the preselecting of the transmission gears.

Other objects, advantages and novel features of the present invention will become apparent from the following detailed description of the invention when considered in conjunction with the accompanying drawings.

DETAILED DESCRIPTION OF THE DRAWINGS

Figure 1:
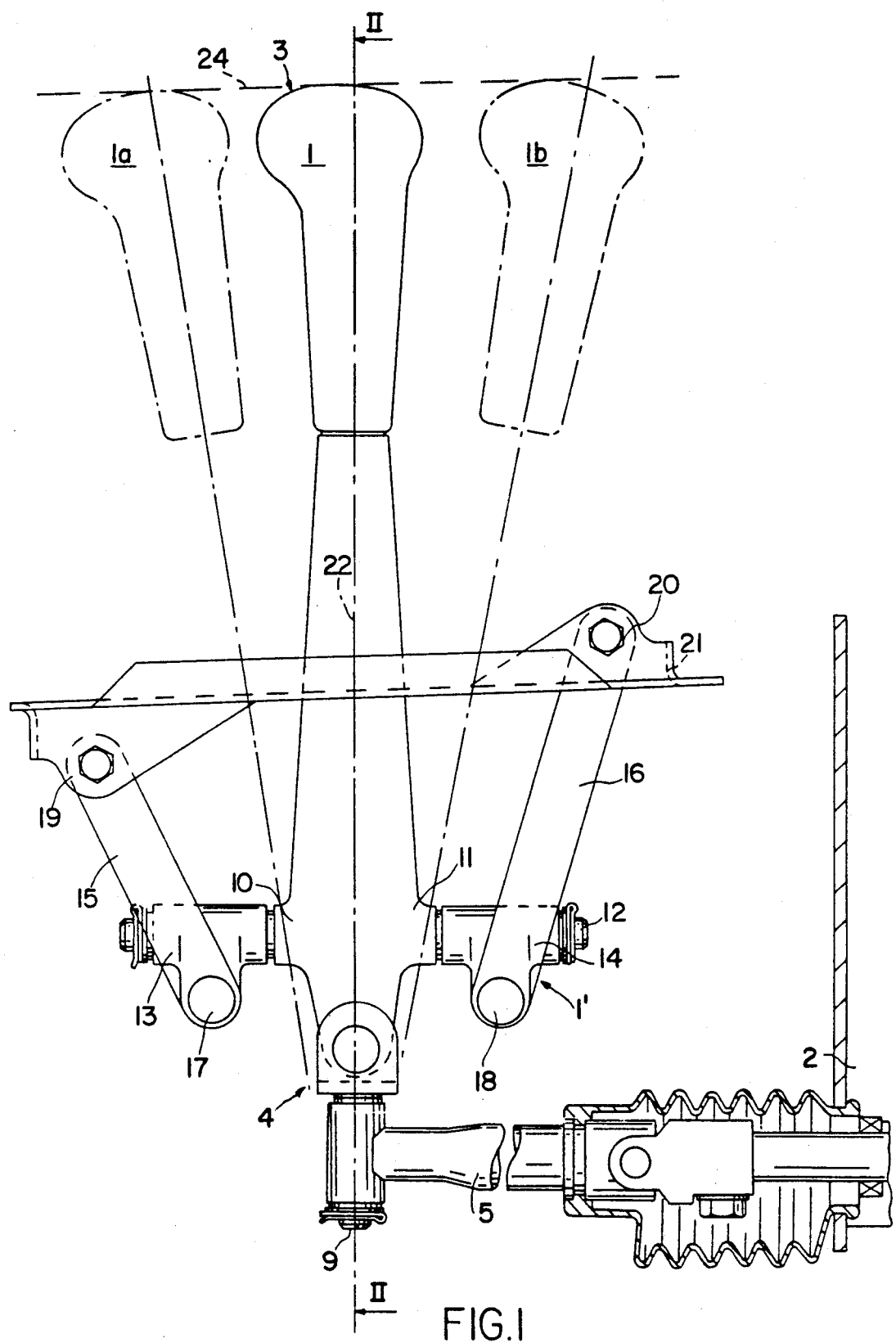
FIG. 1 is a schematic view of a gear shift arrangement showing three shifting positions, constructed according to a preferred embodiment of the invention.

A gear shift lever 1 of a motor vehicle gear shift transmission 2 is equipped at its upper end with a grip 3 to be operated by the driver. At this lower end, the gear shift lever 1 is connected by means of a joint piece 4 with a shift rod 5 engaging in the gear shift transmission 2. The joint piece 4 is formed by two U-shaped tabs 6 and 7 which reach around the gear shift lever and which are pivotally connected with the shift rod 5 by means of a link pin 8 and by a pin 9 which projects downward, is vertical with respect to the link pin 8 and is rotatably connected with the shift rod 5.

Directly above the joint piece 4, a cross piece 1' is mounted on the gear shift lever 1 which forms the coupling device of the joint square. In a first embodiment of the invention according to FIG. 1 and FIG. 2, the crosspiece 1' of the gear shift lever 1 consists of eyes 10, 11 disposed on both sides, in whose bores a pivot pin 12 is fastened. Joint parts 13, 14 are fitted into the ends of the pivot pin 12 which project out of the eyes 10, 11 and are secured axially by means of split-pins. By means of pins 17 and 18, a shorter rocker device 15 is linked to the left joint part 13, and a longer rocker device 16 is linked to the right joint part 14. At the other ends, the two rocker devices 15 and 16 are pivotally connected in such a manner by means of screwable points in fixed bearing points 19, 20 of a frame part 21 of the motor vehicle that the longitudinal centerlines of the rocker devices form an acute angle with respect to one another and that they intersect close to the longitudinal center axis 22 of the gear shift lever 1.

Figure 2:
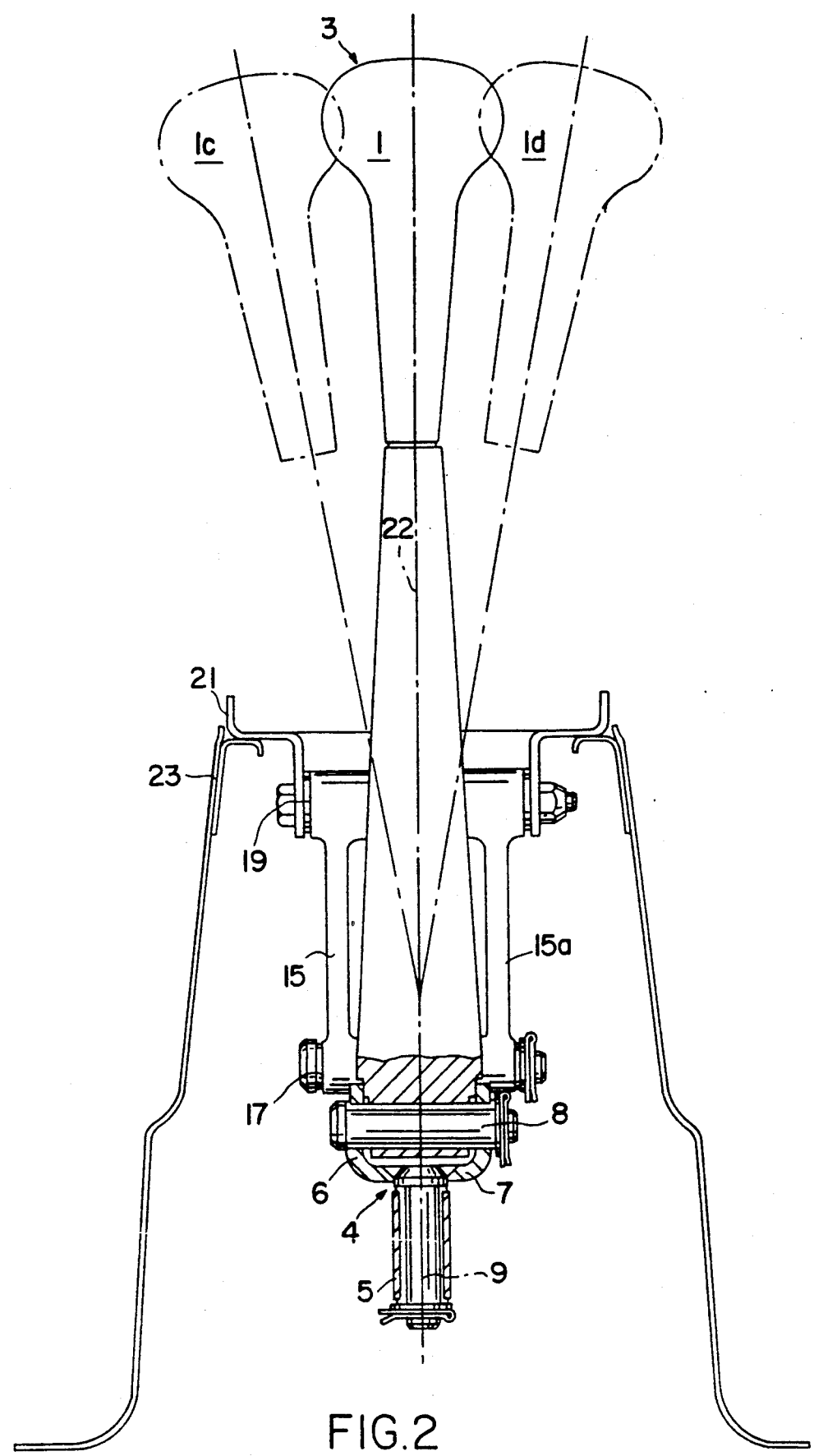
FIG. 2 is a section schematic view taken along Line II—II of FIG. 1, showing three preselecting positions.

The two rocker devices 15, 16, the fixed bearing points 19, 20 and the two joint parts 13, 14 with the pins 17, 18 form a joint square, the coupling device of this joint square being the eyes 10, 11 of the gear shift lever 1 and the pivotal pins 12 fastened in them. As shown in FIG. 2, for the purpose of achieving a better bearing stability, the joint square is supplemented to form a spatial joint square in that, in parallel to the shorter rocker device 15, an additional shorter rocker device 15a is pivotally connected with the fixed bearing point 19; the same applies to the longer rocker device 16. The frame part 21 may be slidably screwed by screws and slot connection S to the chassis 23 in order to be able to change the basic position of the gear shift lever 1 with respect to the shift rod 5.

When the individual transmission gears are shifted, the gear shift lever 1 moves either into the left shifting position 1a or into the right shifting position 1b. The joint square is dimensioned such that the highest point of the grip 3 moves in an approximately straight line 24.

When the gear shift lever according to FIG. 2 is pivoted around the center axis of the pivot pin 12 into the selecting position 1c or 1d, the shift rod is rotated and the desired shifting path is selected.

Figure 3:
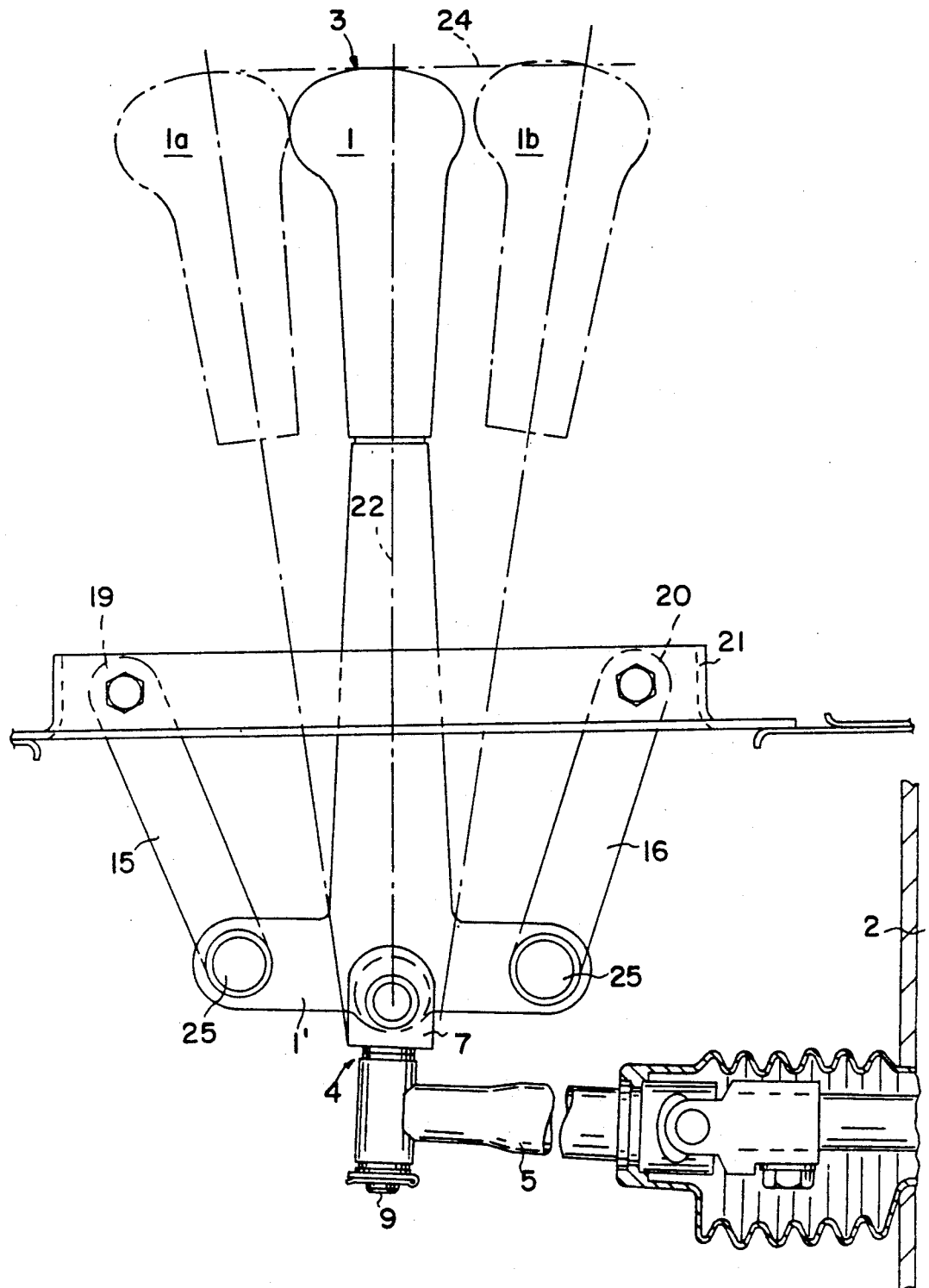
FIG. 3 is a schematic view of a gear shift arrangement having ball joints, constructed in accordance with another preferred embodiment of the invention.
Figure 4:
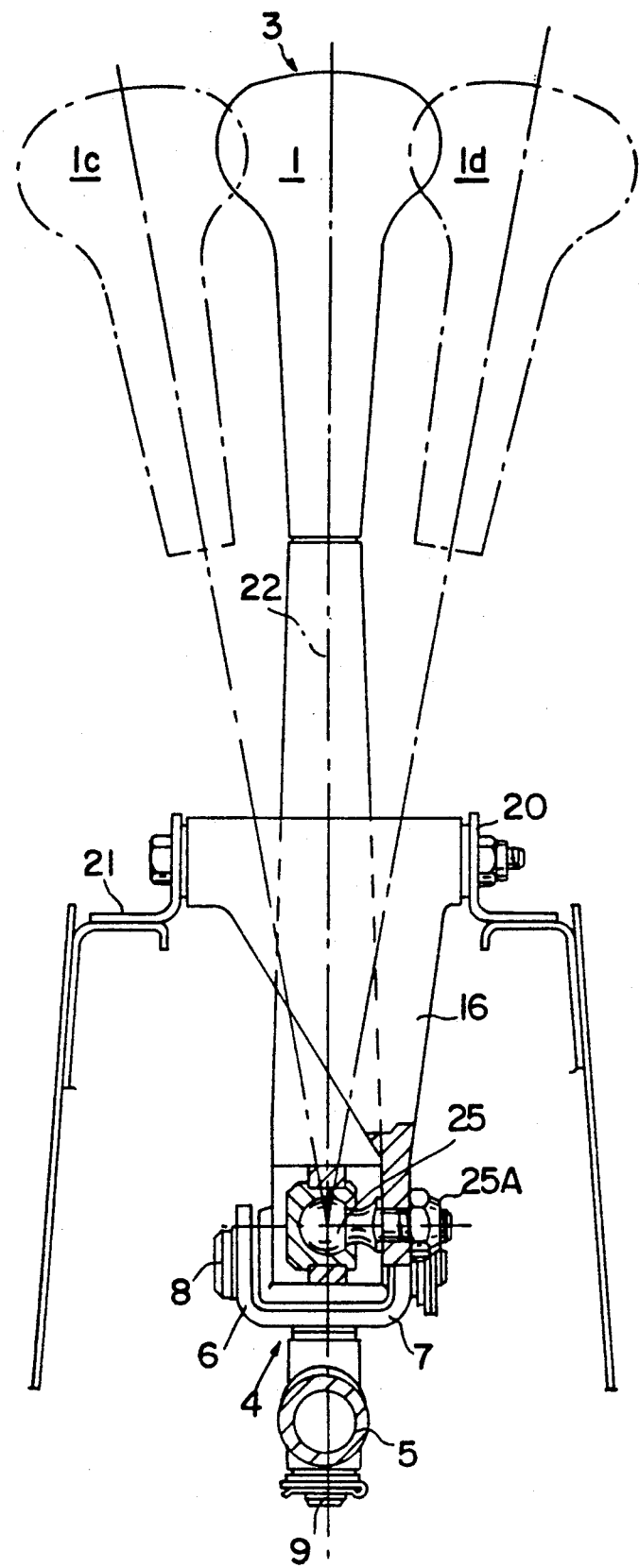
FIG. 4 is a lateral schematic view of FIG. 3.

As shown in FIG. 3 and FIG. 4, in another embodiment of the invention, the joint parts 13, 14 may be replaced by a ball joint 25. For this purpose, the rocker devices 15, 16 must be arranged and their lengths must be selected in such a manner that the pivotal axis of the gear shift lever for the preselecting of the transmission gears is located on the pivoting axes of the rocker devices 15, 16 at the gear shift lever 1. In this case, the left rocker device 15 and the right rocker device 16 have the same length. Sufficient stability may be achieved even by means of two rocker devices 15, 16. At their upper end, the rocker devices 15, 16 can be rotated at fixed bearing points 19, 20 of the frame part 21; on the bottom, they are linked, by means of ball joints 25 (connected by bolt connection 25A), to the crosspiece 1' molded to the gear shift lever 1. Below the ball joints 25, in this case also, a joint piece 4 is rotatably connected with the gear shift lever 1, by means of which the movements of the gear shift lever are transmitted to the shift rod 5. The arrangement of the shifting and preselecting paths of the shift rod 5 with respect to the swivel motions of the gear shift lever may be determined by the selection of the linkage points of the joint square and by the dimensioning of the length of its rocker devices 15, 16. Instead of the straight line 24 shown in FIGS. 1 and 3, the uppermost point of the grip, when the joint square has a different construction according to other preferred embodiments, may move in any arbitrary bent curve, when, as a result of such a course of movement, the gear shift lever is easier to handle for the driver of the motor vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for preselecting and shifting a motor vehicle gear shift transmission, having a gear shift lever which is provided at its upper end with a grip and is guided in the area of its lower end by a joint square which comprises at least two rocker devices pivoted at the vehicle frame and a coupling device by means of which the rocker devices are pivotally connected, a shift rod being pivotally connected to the lower end of the gear shift lever which engages in the gear shift transmission, wherein a crosspiece of the gear shift lever forms the coupling device of the joint square, and wherein the rocker devices are pivotally connected at both sides of the crosspiece; and wherein the rocker devices extend at an acute angle with respect to one another and their longitudinal centerlines intersect in proximity of the longitudinal center line of the gear shift lever.

2. An arrangement according to claim 1, wherein the two rocker devices are each pivotally connected to the gear shift lever by means of a ball joint.

3. An arrangement according to claim 2, wherein a joint piece is pivotally connected to the gear shift lever below the linking points of the rocker devices, and wherein a shift rod, which leads to the gear shift transmission, is rotatably fastened to the joint piece.

4. An arrangement according to claim 1, wherein a joint piece is pivotally connected to the gear shift lever below the linking points of the rocker devices, and wherein a shift rod, which leads to the gear shift transmission, is rotatably fastened to the joint piece.

* * * * *